(12) United States Patent
Yanagihashi et al.

(10) Patent No.: US 8,577,428 B2
(45) Date of Patent: Nov. 5, 2013

(54) INFORMATION PROCESSING APPARATUS

(75) Inventors: Toshimi Yanagihashi, Tokyo (JP); Yoshihiro Sanada, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1530 days.

(21) Appl. No.: 11/998,515

(22) Filed: Nov. 30, 2007

(65) Prior Publication Data

US 2009/0029746 A1 Jan. 29, 2009

(30) Foreign Application Priority Data

Jul. 23, 2007 (JP) ................ P2007-191019

(51) Int. Cl.
*H04M 1/00* (2006.01)
*H04M 3/00* (2006.01)
*H03M 11/00* (2006.01)

(52) U.S. Cl.
USPC ........ 455/575.4; 455/565; 455/418; 455/566; 455/575.3; 341/22; 341/24; 345/169

(58) Field of Classification Search
None
See application file for complete search history.

(56) References Cited

U.S. PATENT DOCUMENTS

| | | | |
|---|---|---|---|
| 5,241,583 A * | 8/1993 | Martensson | 455/565 |
| 5,812,954 A * | 9/1998 | Henriksson | 455/566 |
| 6,073,027 A * | 6/2000 | Norman et al. | 455/575.4 |
| 7,786,901 B2 * | 8/2010 | Alberth et al. | 341/24 |
| 2007/0120710 A1 * | 5/2007 | Rak et al. | 341/22 |

FOREIGN PATENT DOCUMENTS

| | | |
|---|---|---|
| JP | 02-044843 | 2/1990 |
| JP | 2006-005823 A | 1/2006 |
| JP | 2006-134012 A | 5/2006 |
| JP | 2006-269046 A | 10/2006 |

OTHER PUBLICATIONS

Paper issued by the Japanese Patent Office dated Apr. 9, 2010, in connection with an Appeal procedure against a decision of rejection in Japanese priority application No. 2007-191019.

Brief description of contents of reconsideration by the Japanese Examiner in the Japanese Patent Office communication dated Apr. 9, 2010.

Japanese Office Action dated Apr. 15, 2008 issued in a counterpart Japanese Application.

\* cited by examiner

*Primary Examiner* — Jinsong Hu
*Assistant Examiner* — William Nealon
(74) *Attorney, Agent, or Firm* — Maschoff Brennan

(57) ABSTRACT

An information processing apparatus includes a determination unit that determines whether a second key provided on a body is pressed when a first key provided on the body is pressed and a control unit that disables the first key and inhibits an operation in response to an operation with the first key if the determination unit determines that the second key provided on the body is pressed.

8 Claims, 6 Drawing Sheets

INFORMATION PROCESSING APPARATUS

BACKGROUND OF THE INVENTION

1. Field of the Invention

The present invention relates to information processing apparatuses and, more particularly, to an information processing apparatus capable of controlling the operation involved in a key operation.

2. The Related Art

In recent years, slide mobile phones each having first and second bodies slidable on one another are proposed. In addition, linear mobile phones, flip mobile phones, and foldable mobile phones have also been proposed.

Users typically carry mobile phones with them always. For example, users have the mobile phones in their pockets to carry them. If any operation keys or switches of the mobile phones are pressed while being carried, the mobile phones can malfunction.

For example, Japanese Unexamined Patent Application Publication No. 2-44843 discloses a technology for preventing malfunction of a flip mobile phone if any foreign body is caught between the main body of the mobile phone and the flipper thereof.

With the technology disclosed in Japanese Unexamined Patent Application Publication No. 2-44843, it is possible to disable the operation of the power key of a flip mobile phone even if the power key is operated after the flipper is closed.

However, although the technology disclosed in Japanese Unexamined Patent Application Publication No. 2-44843 can prevent the mobile phone from malfunctioning if any foreign body is caught between the main body of the mobile phone and the flipper thereof, it is not possible to apply the technology to another mobile phone, such as a slide mobile phone in which the operation keys are exposed outside.

Accordingly, in the slide mobile phone having the operation keys exposed outside, there is a problem in that one or more operation keys are unintentionally pressed while a user carries the mobile phone in his bag or pocket to cause a malfunction. Specifically, the power key in the operation keys is unintentionally pressed while a user carries the mobile phone in his bag or pocket to turn on or off the mobile phone.

SUMMARY OF THE INVENTION

Accordingly, it is an object of the present invention to provide an information processing apparatus capable of preferably preventing a malfunction unintended by a user even if the operation keys are exposed outside.

According to an embodiment of the present invention, an information processing apparatus includes a determination unit configured to determine whether or not a second key provided on a body is pressed if a first key provided on the body is pressed and a control unit configured to control so as to disable the first key and inhibit an operation in response to an operation with the first key if it is determined by the determination unit that the second key provided on the body is pressed.

According to another embodiment of the present invention, a slide information processing apparatus includes a first body, a second body, a guide member, the first body and the second body being slidable on one another via the guide member, a determination unit configured to determine whether or not a second key provided on the second body is pressed if a first key provided on the second body is pressed, and a control unit configured to control so as to disable the first key and inhibit an operation in response to an operation with the first key if it is determined by the determination unit that the second key provided on the second body is pressed.

According to another embodiment of the present invention, a slide information processing apparatus includes a first body, a second body, a guide member, the first body and the second body being slidable on one another via the guide member, a determination unit configured to determine whether or not the information processing apparatus is in a first state if a first key provided on the second body is pressed, and a control unit configured to control so as to disable the first key and inhibit an operation in response to an operation with the first key if it is determined by the determination unit that the information processing apparatus is in the first state in a case where the first key is pressed for a longer time.

DESCRIPTION OF THE PREFERRED EMBODIMENTS

Exemplary embodiments of the present invention will herein be described with reference to the attached drawings.

Figure 1A:
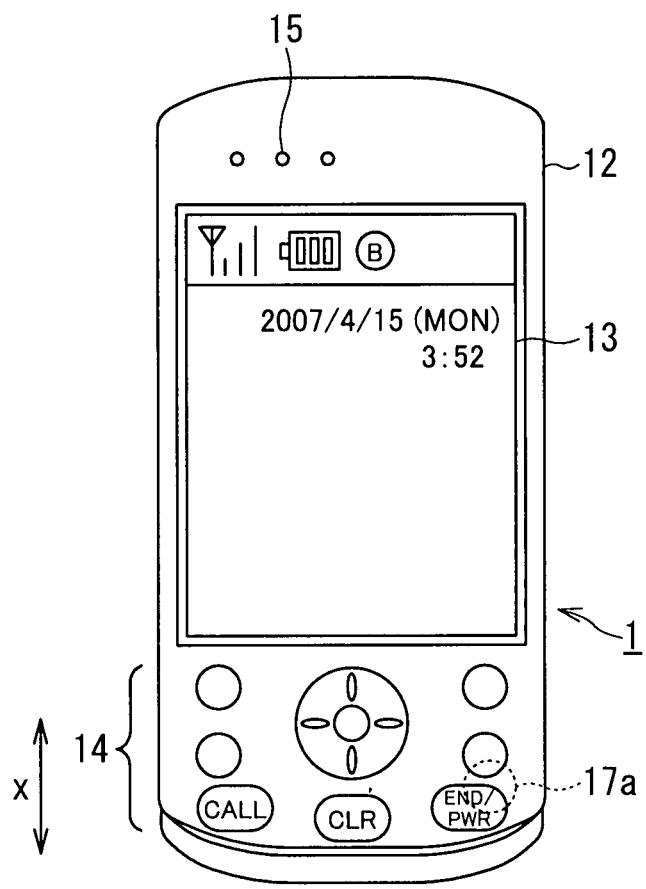
FIGS. 1A and 1B are external views of a mobile phone to which an information processing apparatus according to an embodiment of the present invention is applicable.
Figure 1B:
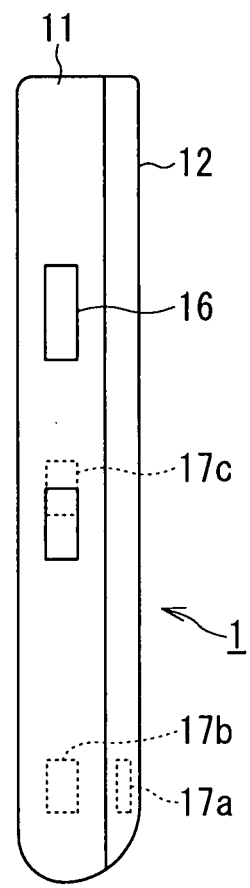

FIGS. 1A and 1B are external views of a slide mobile phone 1 to which an information processing apparatus according to an embodiment of the present invention is applicable.

As shown in FIGS. 1A and 1B, the slide mobile phone 1 has a first body 11 and a second body 12. The second body 12 is provided so as to be slidable on the first body 11 via a guide unit (guide member) (not shown) in the direction indicated by an X arrow. FIG. 1A is an external front view of the slide mobile phone 1 in a closed state where the first body 11 is overlaid with second body 12. FIG. 1B is an external side view of the slide mobile phone 1 in the closed state where the first body 11 is overlaid with the second body 12.

The second body 12 is substantially flat. A main display 13, such as a liquid crystal display, is provided in the central portion on the surface of the second body 12 in FIG. 1A. Second operation keys 14 serving as sub-operation keys are provided in the lower portion on the surface of the second body 12 in FIG. 1A. A user can use the second operation keys 14 to input various instructions. The second operation keys 14 include various operation keys, such as a call key, an end-power key, a clear key, and an e-mail key.

The second body 12 also has four keys arranged in a cross shape and a determination key provided as the second operation keys 14. The user can operate the keys arranged in the cross shape horizontally or vertically to move the active cursor horizontally or vertically. Specifically, for example, the user can operate the keys arranged in the cross shape to perform various operations including scroll up or down of a telephone directory or an e-mail list, turning of the pages of a simple Web page, or feeding of images on the main display 13 provided on the second body 12.

The user can press the determination key to determine various functions. For example, when a desired telephone number is selected from multiple telephone numbers in the telephone directory displayed in the main display 13 in response to a user's operation of any of the keys arranged in a cross shape and the determination key is pressed toward the inner part of the second body 12, the selected telephone number is determined and the determined telephone number is called.

The second body 12 further has the e-mail key at the left side of the keys arranged in a cross shape and the determination key. The user can enable a function of transmitting and receiving a mail by pressing the e-mail key toward the inner part of the second body 12. A browser key is provided at the right side of the keys arranged in a cross shape and the determination key. The user can browse data in a Web page by pressing the browser key toward the inner part of the second body 12.

A speaker 15 is provided at a certain position near the upper end on the surface of the second body 12 in FIG. 1A. The provision of the speaker 15 allows the user to perform audio communication. The second body 12 has a side key 16 used for operating the slide mobile phone 1. Magnetic sensors 17a, 17b, and 17c are provided at certain positions in the inner parts of the first body 11 and the second body 12. The magnetic sensors 17a, 17b, and 17c are used to detect states of the slide mobile phone 1 (a state where the second body 12 is at a closed position and a state where the second body 12 is at an open position). The state where the second body 12 is at the closed position is hereinafter referred to as a closed state and the state where the second body 12 is at the open position is hereinafter referred to as an open state.

The first body 11 and the second body 12 have locking mechanisms (not shown) used for locking the first body 11 and the second body 12 at the open position or the closed position when the second body 12 is slid via the guide unit (guide member) (not shown). The positions of the locking mechanisms match with the positions where the magnetic sensors 17b and 17c are provided. The locking mechanisms have, for example, a structure in which the first body 11 is mechanically engaged with the second body 12. If the user applies a pressure higher than a predetermined reference value to cause the slide operation, the locking state is released to allow the second body 12 to easily slide on the first body 11.

A transmitter-receiver antenna (an antenna 31 shown in FIG. 3 described below) is provided at a certain position inside the slide mobile phone 1. Radio waves are transmitted to and received from a base station (not shown) through the built-in antenna.

Figure 2A:
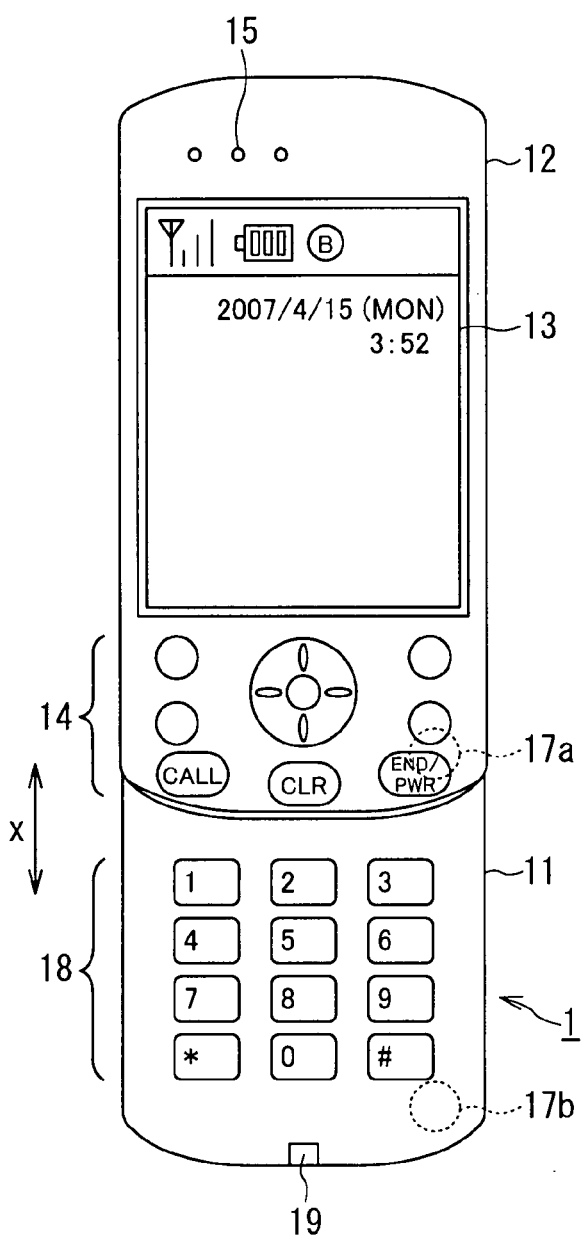
FIGS. 2A and 2B are other external views of the mobile phone to which the information processing apparatus according to the present embodiment of the present invention is applicable.
Figure 2B:
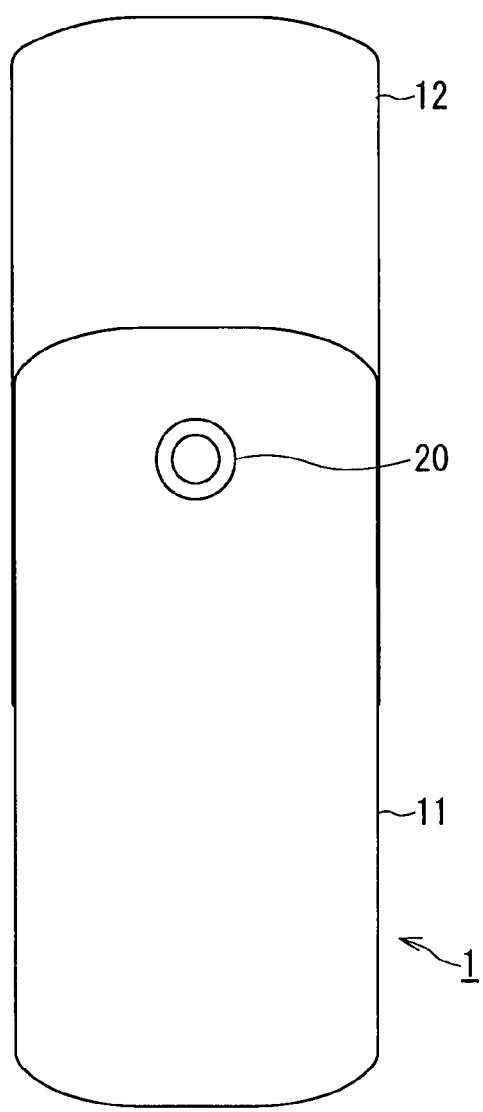

FIGS. 2A and 2B are other external views of the slide mobile phone 1 to which the information processing apparatus according to the present embodiment of the present invention is applicable. FIG. 2A is an external front view of the slide mobile phone 1 in a state where the second body 12 in FIG. 1A is slid longitudinally (in the X direction) to be locked at the open position. FIG. 2B is an external rear view of the slide mobile phone 1 in the state where the second body 12 in FIG. 1A is slid longitudinally to be locked at the open position.

The first body 11 is substantially flat, like the second body 12. First operation keys 18 serving as main operation keys are provided in the lower portion on the surface of the first body 11 in FIG. 2A. The user can use the first operation keys 18 to input various instructions. The first operation keys 18 include numeric keys from "0" to "9".

The first body 11 also has a microphone 19 provided at the lower side of the first operation keys 18. The microphone 19 is used to collect the voice of the user during talking.

The first body 11 has a battery pack (not shown) provided at the rear side thereof. When the end-power key is turned on, power is supplied from the battery pack to each circuit to activate the slide mobile phone 1. As shown in FIG. 2B, the first body 11 in FIG. 2A has a CCD camera 20 on the rear surface thereof. The CCD camera 20 captures an image of a desired object.

Figure 3:
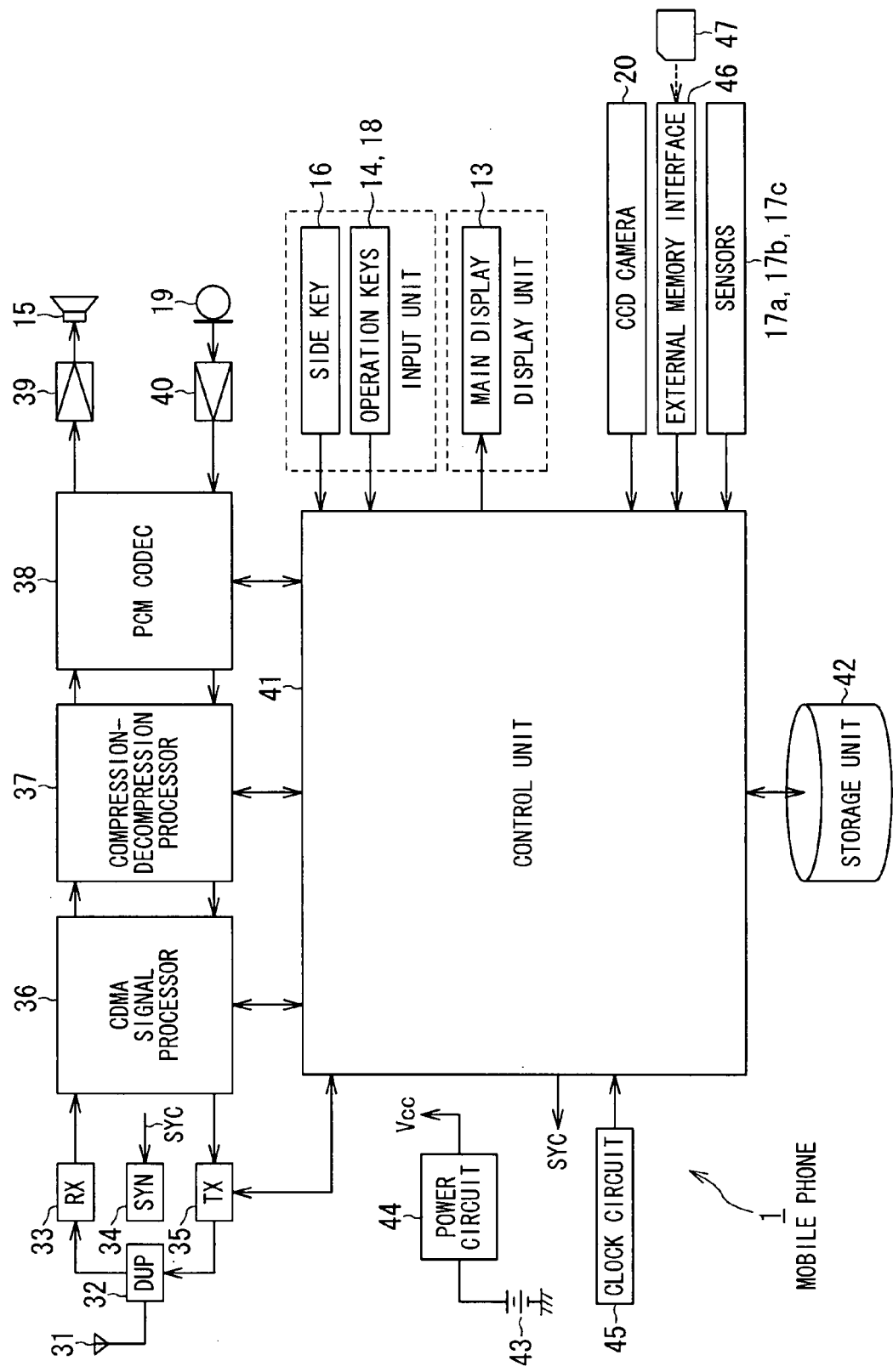
FIG. 3 is a block diagram illustrating an example of the internal configuration of the mobile phone to which the information processing apparatus according to the present embodiment of the present invention is applicable.

FIG. 3 is a block diagram illustrating an example of the internal configuration of the slide mobile phone 1 to which the information processing apparatus according to the present embodiment of the present invention is applicable.

In the slide mobile phone 1 shown in FIG. 3, the antenna 31 receives a radio signal transmitted from the base station (not shown) and supplies the received radio signal to a receiver circuit (RX) 33 through an antenna duplexer (DUP) 32. The receiver circuit 33 mixes the received radio signal with a local oscillator signal supplied from a frequency synthesizer (SYN) 34 to down-convert the radio signal into an intermediate-frequency signal (frequency conversion). The receiver circuit 33 performs quadrature demodulation to the down-converted intermediate-frequency signal to output a reception baseband signal. The frequency of the local oscillator signal generated by the frequency synthesizer 34 is instructed with a control signal SYC supplied from a control unit 41.

The reception baseband signal is supplied from the receiver circuit 33 to a CDMA signal processor 36. The CDMA signal processor 36 is provided with a RAKE receiver (not shown). The RAKE receiver despreads each path included in the reception baseband signal with a spread code (that is, the same spread code as that of the spread reception signal). The signal of each path that is despread is subjected to phase adjustment and, then, is subjected to coherent RAKE combination. Data series subjected to the RAKE combination is subjected to deinterleave and channel decoding (error correction decoding) and, then, is subjected to binary determination, thereby generating reception packet data in a predetermined transmission format. The reception packet data is supplied to a compression-decompression processor 37.

The compression-decompression processor 37 is, for example, a DSP. The compression-decompression processor 37 separates the reception packet data supplied from the CDMA signal processor 36 for every medium with a demultiplexer (not shown) and decodes the separated reception packet data. For example, in a talk mode, the compression-decompression processor 37 decodes audio data corresponding to a voice included in the reception packet data by speech codec. If the reception packet data includes moving image data, for example, in a videophone mode, the compression-decompression processor 37 decodes the moving image data by video codec. If the reception packet data is download content, the compression-decompression processor 37 decompresses the download content and supplies the decompressed download content to the control unit 41.

A digital audio signal resulting from the decoding is supplied to a PCM CODEC 38. The PCM CODEC 38 performs PCM decoding to the digital audio signal supplied from the compression-decompression processor 37 and supplies an analog audio signal resulting from the PCM decoding to a reception amplifier 39. The analog audio signal is amplified by the reception amplifier 39 and is output from the speaker 15.

The digital moving image signal decoded by the video codec in the compression-decompression processor 37 is supplied to the control unit 41. The control unit 41 displays a moving image based on the digital moving image signal supplied from the compression-decompression processor 37 in the main display 13 via a video RAM (for example, a VRAM) (not shown). The control unit 41 may display a moving image based on moving image data captured by the CCD camera 20 in the main display 13 via the video RAM (not shown), in addition to the moving image based on the received moving image data.

If the reception packet data is an e-mail, the compression-decompression processor 37 supplies the e-mail to the control unit 41. The control unit 41 stores the e-mail supplied from the compression-decompression processor 37 in a storage unit 42. The control unit 41 reads out the e-mail stored in the storage unit 42 in response to a user's operation with any of the first operation keys 18 and the second operation keys 14, which serve as an input unit, and displays the readout e-mail in the main display 13.

An voice signal (analog audio signal) of a speaker (user) received by the microphone 19 in the talk mode is amplified by a transmission amplifier 40 to an appropriate level and is subjected to PCM coding by the PCM CODEC 38. A digital audio signal resulting from the PCM coding is supplied to the compression-decompression processor 37. A moving image signal supplied from the CCD camera 20 is digitized by the control unit 41 and is supplied to the compression-decompression processor 37. In addition, an e-mail, which is text data, created in the control unit 41 is also supplied to the compression-decompression processor 37.

The compression-decompression processor 37 encodes and compresses the digital audio signal supplied from the PCM CODEC 38 in a format corresponding to a predetermined transmission data rate to generate audio data. The compression-decompression processor 37 encodes and compresses the digital moving image signal supplied from the control unit 41 to generate moving image data. The compression-decompression processor 37 multiplexes the audio data or the moving image data in a predetermined transmission format with a demultiplexer (not shown), packetizes the multiplexed audio data or moving image data, and supplies the transmission packet data after the packetization to the CDMA signal processor 36. The compression-decompression processor 37 also multiplexes the e-mail supplied from the control unit 41 into transmission packet data.

The CDMA signal processor 36 spectrum-spreads the transmission packet data supplied from the compression-decompression processor 37 with a spread code allocated to the transmission channel and supplies the output signal resulting from the spread spectrum processing to a transmitter circuit (TX) 35. The transmitter circuit 35 modulates the signal resulting from the spread spectrum processing in a digital modulation format, such as QPSK. The transmitter circuit 35 mixes the transmission signal resulting from the digital modulation with a local oscillator signal generated by the frequency synthesizer 34 to up-convert the transmission signal into a radio signal (frequency conversion). The transmitter circuit 35 RF-amplifies the radio signal resulting from the up-conversion so as to yield a transmission power level indicated by the control unit 41. The RF-amplified radio signal is supplied to the antenna 31 through the antenna duplexer 32 and is transmitted to the base station (not shown) from the antenna 31.

The slide mobile phone 1 is also provided with an external memory interface 46. The external memory interface 46 has a slot from which a memory card 47 is detachable. The memory card 47 is a flash memory card, such as a NAND flash memory card or NOR flash memory card. A variety of data, such as image data, audio data, and music data, can be written in or read out from the memory card 47 through a 10-pin terminal.

The control unit 41 includes, for example, a CPU, a ROM, and a RAM. The CPU executes a variety of processing in accordance with programs stored in the ROM or various application programs loaded from the storage unit 42 into the RAM. The CPU generates various control signals and supplies the generated control signals to the components in the slide mobile phone 1 in order to control the entire slide mobile phone 1. The RAM stores data necessary for the CPU to execute the variety of processing.

The storage unit 42 is, for example, a flash memory device, which is an electronically erasable and programmable read only memory, or an HDD. The storage unit 42 stores the various application programs executed by the CPU in the control unit 41 or various data groups.

A power circuit 44 generates a predetermined power supply voltage Vcc on the basis of an output from a battery 43 and supplies the generated power supply voltage Vcc to the circuits in the slide mobile phone 1. The slide mobile phone 1 is further provided with a clock circuit 45 for accurately measuring the current time.

Figure 4:
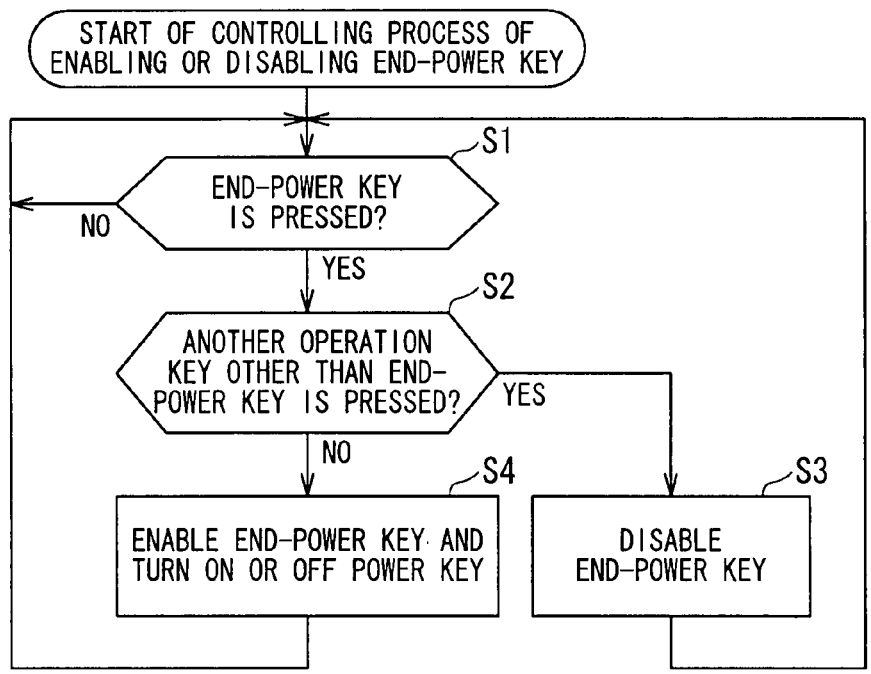
FIG. 4 is a flowchart showing an example of a controlling process of enabling or disabling an end-power key in the mobile phone shown in FIG. 3.

FIG. 4 is a flowchart showing an example of a controlling process of enabling or disabling the end-power key in the slide mobile phone 1 shown in FIG. 3. The controlling process of enabling or disabling the end-power key is started when the user presses the end-power key in the second operation keys 14 or when any external pressure is applied to the slide mobile phone 1 with being put in the pocket or bag of the user to unintentionally press the end-power key.

Referring to FIG. 4, in Step S1, the control unit 41 determines whether the end-power key in the second operation keys 14 is pressed. The control unit 41 waits until the control unit 41 determines that the end-power key in the second operation keys 14 is pressed. To be more specific, the control unit 41 determines that the end-power key in the second operation keys 14 is pressed, when the user presses the end-power key in the second operation keys 14 or when any external pressure is applied to the slide mobile phone 1 with being put in the pocket or bag of the user to unintentionally press the end-power key.

The control unit 41 cannot determine whether the user presses the end-power key in the second operation keys 14 or whether any external pressure is applied to the slide mobile phone 1 with being put in the pocket or bag of the user to unintentionally press the end-power key only on the basis of the determination of whether the end-power key in the second operation keys 14 is pressed. In the latter case, it is normally supposed that the external pressure is also applied to another operation key that is provided on the surface of the second body 12 and that has the same height as that of the end-power key, in addition to the end-power key in the second operation keys 14 (that is, a state where the multiple keys are pressed). Accordingly, the control unit 41 also determines whether another operation key is concurrently pressed when the end-power key is pressed. If the control unit 41 determines that another operation key is concurrently pressed when the end-power key is pressed, the control unit 41 recognizes that the end-power key is unintentionally pressed, as in the latter case. If the control unit 41 determines that another operation key is not concurrently pressed when the end-power key is pressed, the control unit 41 recognizes that the user presses the end-power key in the second operation keys 14.

If the control unit 41 determines in Step S1 that the end-power key in the second operation keys 14 is pressed, then in Step S2, the control unit 41 determines whether any operation key other than the end-power key in the second operation keys 14 is pressed. In other words, the control unit 41 determines whether the end-power key is unintentionally pressed or whether the user presses the end-power key in the second operation keys 14.

If the control unit 41 determines in Step S2 that any operation key other than the end-power key in the second operation keys 14 is pressed, then in Step S3, the control unit 41 recognizes that any external pressure is applied to the slide mobile phone 1 with being put in the pocket or bag of the user to unintentionally press the end-power key and disables the end-power key. Accordingly, it is possible to disable the function of the end-power key in the second operation keys 14 as the power key and to inhibit the on-operation or off-operation of the end-power key as the power key when any external pressure is applied to the slide mobile phone 1 with being put in the pocket or bag of the user to unintentionally press the end-power key. Consequently, even if the operation keys are exposed outside, like the second operation keys 14 on the second body 12, it is possible to preferably prevent any malfunction unintended by the user.

After the control unit 41 disables the end-power key in Step S3, the process goes back to Step S1 to repeat the steps subsequent to Step S1. Accordingly, even if a similar situation repeatedly occurs, it is possible to disable the function of the end-power key in the second operation keys 14 as the power key to preferably prevent any malfunction unintended by the user.

If the control unit 41 determines in Step S2 that any operation key other than the end-power key in the second operation keys 14 is not pressed, then in Step S4, the control unit 41 recognizes that the end-power key in the second operation keys 14 is pressed and enables the end-power key to turn on or off the end-power key as the power key. Accordingly, the end-power key is turned on or off as the normal power key in response to a user's operation with the second operation keys 14.

After the control unit 41 enables the end-power key in Step S4, the process goes back to Step S1 to repeat the steps subsequent to Step S1.

In the slide mobile phone 1 according to the present embodiment of the present invention in which the second body 12 is provided so as to be slidable on the first body 11 via the guide unit (not shown), it is determined whether any operation key other than the end-power key in the second operation keys 14 provided on the second body 12 is pressed when, for example, the end-power key in the second operation keys 14 provided on the second body 12 is pressed. If it is determined that any operation key other than the end-power key in the second operation keys 14 provided on the second body 12 is pressed, the end-power key can be disabled to inhibit the end-power key from operating in response to a user's operation of the end-power key.

The function of the end-power key in the second operation keys 14 as the power key can be disabled to inhibit the on-operation or off-operation of the end-power key as the power key when any external pressure is applied to the slide mobile phone 1 with being put in the pocket or bag of the user to unintentionally press the end-power key. Consequently, it is possible to preferably prevent any malfunction unintended by the user even if the operation keys are exposed outside, like the second operation keys 14 provided on the second body 12. As a result, it is possible to improve the user-friendliness of the slide mobile phone 1.

Although the end-power key in the second operation keys 14 is explicitly described in the present embodiment of the present invention, the present invention is not limited to such a case and is applicable to all the operation keys on the surface of the second body 12. For example, the present invention is applicable to another operation key, such as the call key, in the second operation keys 14.

In the normal state, after the user presses the end-power key to turn on or off the power supply, the user can erroneously press another operation key in the second operation keys 14. In this case, the slide mobile phone 1 cannot be undesirably turned on or off despite the fact that the user intentionally presses the end-power key. Accordingly, it may be determined whether any operation key other than the end-power key in the second operation keys 14 is pressed after a predetermined time (for example, two to three seconds) elapsed since the end-power key is pressed so that it can be accurately determined whether the user presses the end-power key in the second operation keys 14 or whether any external pressure is applied to the slide mobile phone 1 with being put in the pocket or bag of the user to unintentionally press the end-power key. With this method, it is possible to preferably prevent any malfunction unintended by the user. As a result, it is possible to further improve the user-friendliness of the slide mobile phone 1. A controlling process of enabling or disabling the end-power key by using the above method will now be described with reference to FIG. 5.

Figure 5:
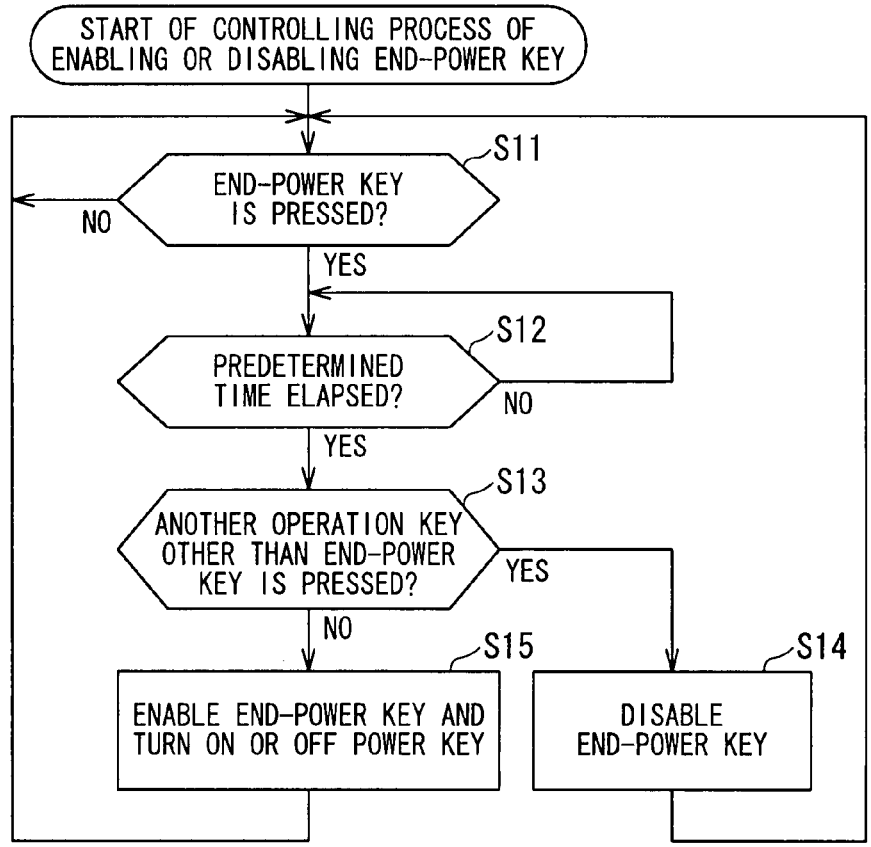
FIG. 5 is a flowchart showing another example of the controlling process of enabling or disabling the end-power key in the mobile phone shown in FIG. 3.

FIG. 5 is a flowchart showing another example of the controlling process of enabling or disabling the end-power key in the slide mobile phone 1 shown in FIG. 3. Since Steps S11 and S13 to S15 in FIG. 5 are similar to Steps S1 to S4 in FIG. 4, a description of Steps S11 and S13 to S15 in FIG. 5 is omitted herein.

Referring to FIG. 5, if the control unit 41 determines in Step S11 that the end-power key in the second operation keys 14 is pressed, then in Step S12, the control unit 41 determines whether a predetermined time (for example, two to three seconds) set in advance by the clock circuit 45 elapsed. The control unit 41 waits until the control unit 41 determines that the predetermined time (for example, two to three seconds) set in advance elapsed. If the control unit 41 determines in Step S12 that the predetermined time (for example, two to three seconds) set in advance elapsed, the process goes to Step S13 to repeat the steps subsequent to Step S13. In Step S13, the control unit 41 determines whether any operation key other than the end-power key in the second operation keys 14 is pressed.

If the user erroneously presses another operation key after pressing the end-power key to turn on or off the power supply, it is supposed that the state where the end-power key and the other operation key are pressed can be resolved after two to three seconds elapsed even if the other operation key is pressed. In contrast, if any external pressure is applied to the slide mobile phone 1 with being put in the pocket or bag of the user to unintentionally press the end-power key, it is supposed that the state where the end-power key and the other operation key are pressed, caused by the external pressure, cannot be immediately resolved even after two to three seconds elapsed.

Accordingly, if it is determined that the end-power key in the second operation keys 14 is pressed, it can be accurately determined whether the user presses the end-power key in the second operation keys 14 or whether any external pressure is applied to the slide mobile phone 1 with being put in the pocket or bag of the user to unintentionally press the end-power key by determining whether any operation key other than the end-power key in the second operation keys 14 is pressed after a predetermined time (for example, two to three seconds) elapsed. Consequently, it is possible to preferably prevent any malfunction unintended by the user even if the operation keys are exposed outside, like the second operation keys 14 provided on the second body 12. As a result, it is possible to further improve the user-friendliness of the slide mobile phone 1.

Instead of the determination of whether a predetermined time set in advance elapsed, it may be determined whether any operation key other than the end-power key in the second operation keys 14 is pressed when the power key is turned on or off.

It is supposed that the slide mobile phone 1 is usually put in a pocket or bag of the user in the closed state, instead of the open state. In other words, since it is supposed that the user is using the slide mobile phone 1 when the slide mobile phone 1 is in the open state, the end-power key may be turned on or off as the power key. Accordingly, if it is determined that the end-power key is pressed, the magnetic sensors 17a to 17c may be used to determine whether the slide mobile phone 1 is in the closed state. If it is determined that the slide mobile phone 1 is in the closed state, it is determined whether any operation key other than the end-power key in the second operation keys 14 is pressed. If it is determined that the slide mobile phone 1 is in the open state, the end-power key is immediately turned on or off as the power key. With this method, it is possible to preferably prevent any malfunction unintended by the user. As a result, it is possible to further improve the user-friendliness of the slide mobile phone 1. A controlling process of enabling or disabling the end-power key by using the above method will now be described with reference to FIG. 6.

Figure 6:
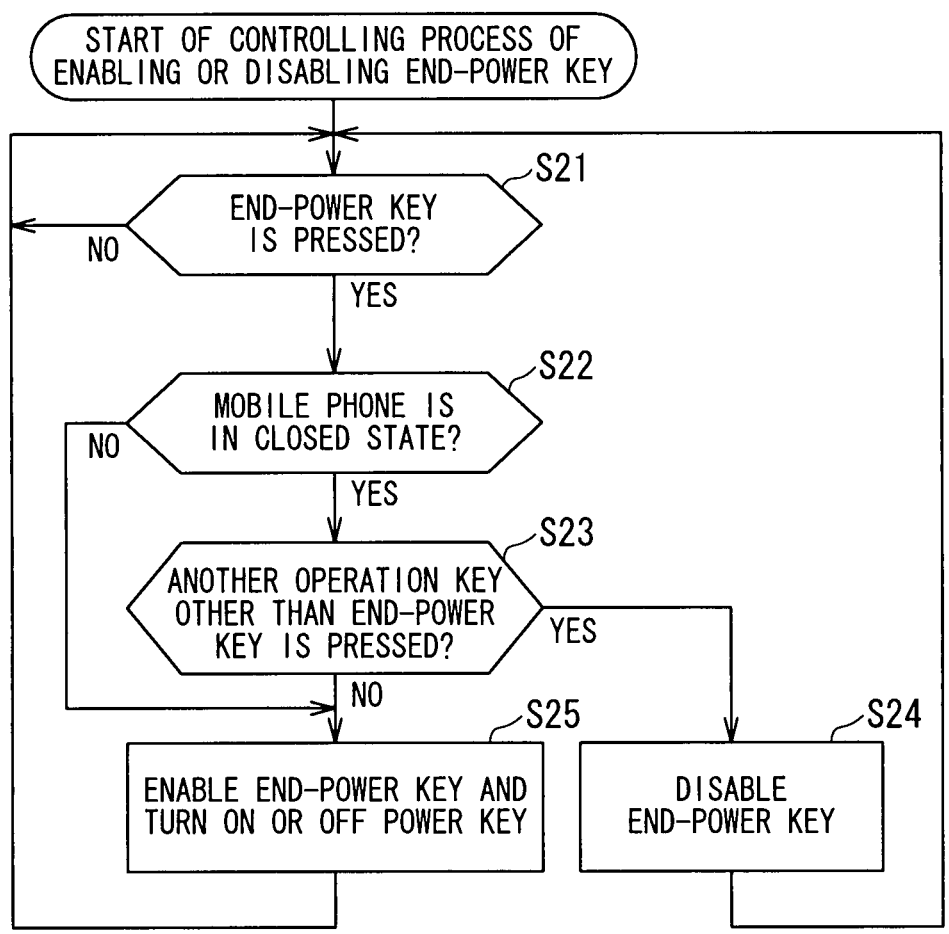
FIG. 6 is a flowchart showing another example of the controlling process of enabling or disabling the end-power key in the mobile phone shown in FIG. 3.

FIG. 6 is a flowchart showing another example of the controlling process of enabling or disabling the end-power key in the slide mobile phone 1 shown in FIG. 3. Since Steps S21 and S23 to S25 in FIG. 6 are similar to Steps S1 to S4 in FIG. 4, a description of Steps S21 and S23 to S25 in FIG. 6 is omitted herein.

Referring to FIG. 6, if the control unit 41 determines in Step S21 that the end-power key in the second operation keys 14 is pressed, then in Step S22, the control unit 41 uses the magnetic sensors 17a to 17c to determine whether the slide mobile phone 1 is in the closed state. If the control unit 41 determines in Step S22 that the slide mobile phone 1 is in the closed state, the process goes to Step S23 to repeat the steps subsequent to Step S23.

If the control unit 41 determines in Step S22 that the slide mobile phone 1 is not in the closed state (that is, the slide mobile phone 1 is in the open state), the control unit 41 recognizes that the user is using the slide mobile phone 1. In this case, the process skips Step S23. In Step S25, the control unit 41 recognizes that the user presses the end-power key in the second operation keys 14 and enables the end-power key to turn on or off the end-power key as the power key. Accordingly, the end-power key is immediately turned on or off as the normal power key in response to a user's operation with the second operation keys 14.

After the control unit 41 enables the end-power key in Step S25, the process goes back to Step S21 to repeat the steps subsequent to Step S21.

The function of the end-power key as the power key can be disabled to inhibit the on-operation or off-operation of the end-power key as the power key only if the slide mobile phone 1 is in the closed state even when the operation keys are exposed outside, like the second operation keys 14 on the second body 12. Consequently, it is possible to preferably prevent any malfunction unintended by the user. In addition, it is possible to immediately turn on or off the end-power key as the normal power key in response to a user's operation with the second operation keys 14 when the user is using the slide mobile phone 1. As a result, it is possible to further improve the user-friendliness of the slide mobile phone 1.

In recent years, since one operation key functions not only as the power key but also as the end key to be used as the end-power key, as described above, the slide mobile phone 1 can receive an incoming call from another mobile phone even when the slide mobile phone 1 is in the closed state and the user can talk by using the slide mobile phone 1. In such a case, the user possibly presses the end-power key to terminate the talking even when the slide mobile phone 1 is in the closed state. Accordingly, simply disabling the end-power key because the slide mobile phone 1 is in the closed state prevents the user from terminating the talking. If any external pressure is applied to the slide mobile phone 1 with being put in the pocket or bag of the user to unintentionally press the end-power key, it is supposed that the end-power key is continuously pressed for a longer time because of the external pressure.

Accordingly, when the slide mobile phone 1 is in the closed state, it may be determined whether the end-power key is pressed for a longer time (long depression) or for a shorter time (short depression). If it is determined that the end-power key is pressed for a longer time (long depression), the function of the end-power key as the power key may be disabled to inhibit the on-operation or off-operation of the end-power key as the power key. If it is determined that the end-power key is pressed for a shorter time (short depression), the function of the end-power key as the end key may be enabled to terminate the call as the end key. A controlling process of enabling or disabling the end-power key by using the above method will now be described with reference to FIG. 7.

Figure 7:
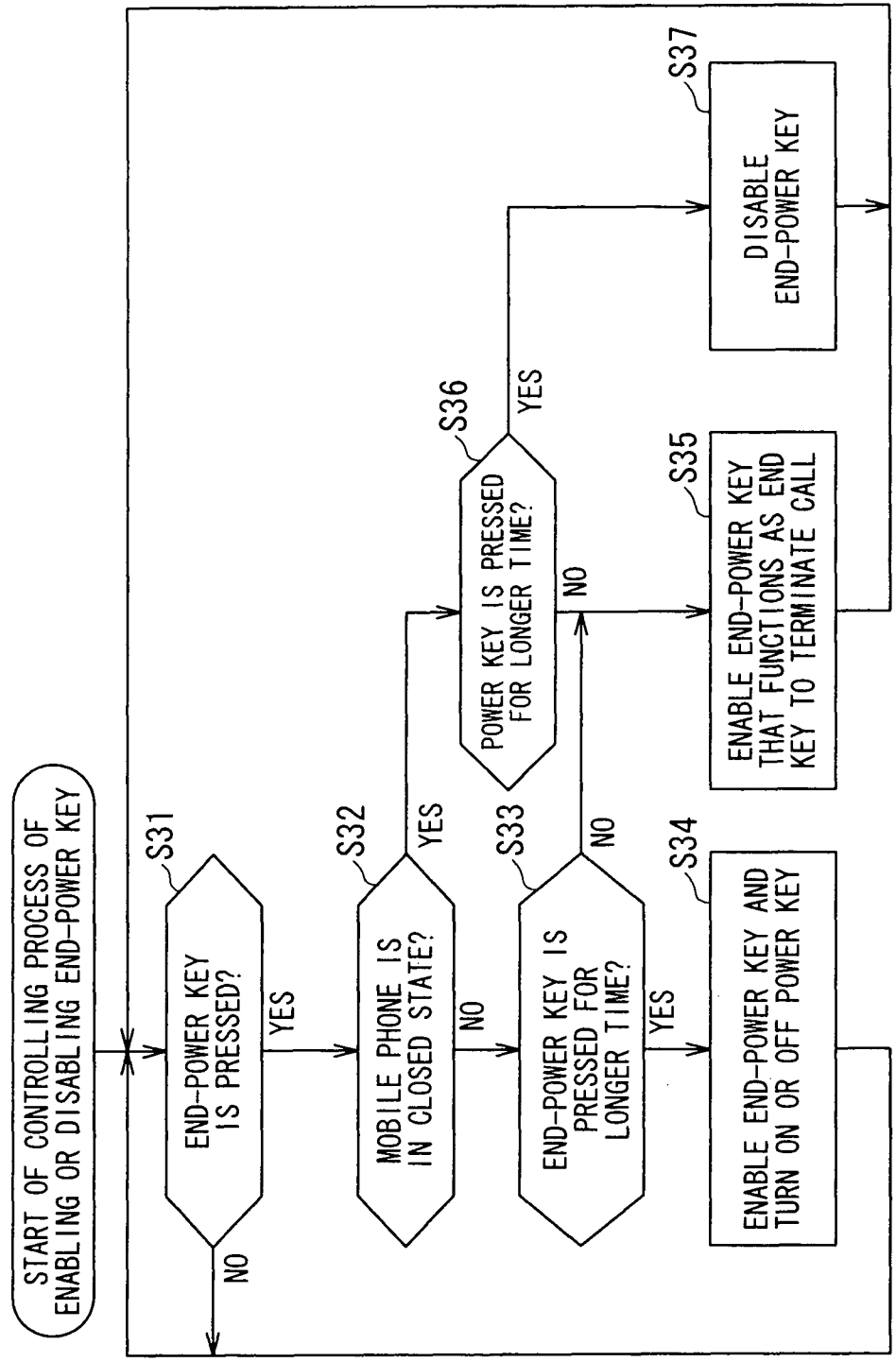
FIG. 7 is a flowchart showing another example of the controlling process of enabling or disabling the end-power key in the mobile phone shown in FIG. 3.

FIG. 7 is a flowchart showing another example of the controlling process of enabling or disabling the end-power key in the slide mobile phone 1 shown in FIG. 3. Since Steps S31, S32, S34, and S37 in FIG. 7 are similar to Steps S21 to S22 and Steps S24 to S25 in FIG. 6, a description of Steps S31, S32, S34, and S37 in FIG. 7 is omitted herein.

Referring to FIG. 7, if the control unit 41 determines in Step S32 that the slide mobile phone 1 is not in the closed state (that is, the slide mobile phone 1 is in the open state), then in Step S33, the control unit 41 recognizes that the user is using the slide mobile phone 1 and uses the clock circuit 45 to determine whether the end-power key is pressed for a longer time (long depression). The short depression means that one operation key is continuously pressed for a predetermined time (for example, for one second) set in advance. The long depression means that one operation key is continuously pressed for a predetermined time (for example, three seconds) set in advance so as to be longer than the time set for the short depression.

If the control unit 41 determines in Step S33 that the end-power key is pressed for a longer time (long depression), then in Step S34, the control unit 41 enables the end-power key and turns on or off the power key. Then, the process goes back to Step S31 to repeat the steps subsequent to Step S31.

If the control unit 41 determines in Step S33 that the end-power key is not pressed for a longer time (the end-power key is pressed for a shorter time (short depression)), then in Step S35, the control unit 41 enables the end-power key that functions as the end key to terminate the call. Then, the process goes back to Step S31 to repeat the steps subsequent to Step S31.

If the control unit 41 determines in Step S32 that the slide mobile phone 1 is in the closed state, then in Step S36, the control unit 41 uses the clock circuit 45 to determine whether the end-power key is pressed for a longer time (long depression).

If the control unit 41 determines in Step S36 that the slide mobile phone 1 is not pressed for a longer time (the slide mobile phone 1 is pressed for a shorter time (short depression)), the control unit 41 recognizes that the user is using the slide mobile phone 1 for talking. Then, in Step S35, the control unit 41 enables the end-power key that functions as the end key to terminate the call. Then, the process goes back to Step S31 to repeat the steps subsequent to Step S31.

With the above method, when the user presses the end-power key to terminate the talking even if the slide mobile phone 1 is in the closed state, the end-power key can function as the end key to terminate the call. Consequently, it is possible to preferably prevent any malfunction unintended by the user and to further improve the user-friendliness of the slide mobile phone 1.

If the control unit 41 determines in Step S36 that the end-power key is pressed for a longer time (long depression), the control unit 41 recognizes that any external pressure is applied to the slide mobile phone 1 with being put in the pocket or bag of the user to unintentionally press the end-power key. Then, in Step S37, the control unit 41 disables the end-power key.

The processes described above according to the embodiments of the present invention may be appropriately combined with each other. Although the slide mobile phone 1 is explicitly described as the mobile phone in which the operation keys are exposed outside in the embodiments of the present invention, the present invention is not limited to such a case and is applicable to a linear mobile phone or a foldable mobile phone.

The present invention is applicable to a PDA, a personal computer, a portable game machine, a portable music player, a portable moving image player, or another information processing apparatus, in addition to the slide mobile phone 1.

The series of processes according to the embodiments of the present invention may be performed by software or may be performed by hardware.

Although the steps in the flowcharts are performed in time series in the described order in the embodiments of the present invention, the steps may be performed in parallel or individually.

What is claimed is:

1. A slide information processing apparatus comprising:
   a first body;
   a second body;
   a guide member, the first body and the second body being slidable on one another via the guide member;
   a determination unit configured to determine, when a first key of a plurality of operation keys provided on the second body is pressed, whether a second key of the plurality of operation keys provided on the second body which is other than the first key is pressed concurrently with the pressing of the first key, in order to recognize that the first key is unintentionally pressed; and
   a control unit configured to disable the first key and inhibit an operation of turning on or off the information processing apparatus by the unintentional pressing of the first key if it is determined by the determination unit that the second key provided on the second body is concurrently pressed.

2. The information processing apparatus according to claim 1,
   wherein the determination unit is configured to determine whether or not the second key provided on the second body is pressed after a predetermined time set in advance elapsed since the first key provided on the second body is pressed.

3. The information processing apparatus according to claim 1,
   wherein the determination unit is configured to determine whether or not the second key provided on the second body is pressed depending on the state of the information processing apparatus if the first key provided on the second body is pressed.

4. The information processing apparatus according to claim 3,
   wherein the determination unit is configured to determine whether or not the second key provided on the second body is pressed if the information processing apparatus is in an open state in which the second body slides to be locked in a case where the first key provided on the second body is pressed.

5. The information processing apparatus according to claim 3,
   wherein the determination unit is configured not to perform determination and the control unit is configured to perform an operation in response to an operation with the first key if the information processing apparatus is in a closed state in which the first body is overlaid with the second body in a case where the first key provided on the second body is pressed.

6. The information processing apparatus according to claim 1,
   wherein the first key is configured to at least includes a power key.

7. A slide information processing apparatus comprising:
   a first body;
   a second body;
   a guide member, the first body and the second body being slidable on one another via the guide member;
   a determination unit configured to determine, when a first key of a plurality of operation keys provided on the second body is pressed, whether or not the information processing apparatus is in a first state when the first key provided on the second body is pressed concurrently with a second key of the plurality of operation keys provided on the second body, wherein the second key is different from the first key, wherein the determination unit determines whether or not the information processing apparatus is in the first state in order to recognize that the first key is unintentionally pressed; and
   a control unit configured to disable the first key and inhibit an operation turning on or off the information processing apparatus by the unintentional pressing of the first key if it is determined by the determination unit that the information processing apparatus is in the first state in a case where the first key is concurrently pressed with the second key.

8. The information processing apparatus according to claim 7,
   wherein the control unit is configured to perform an operation in response to an operation with the first key if the first key is pressed for a shorter time.

* * * * *